2,944,327

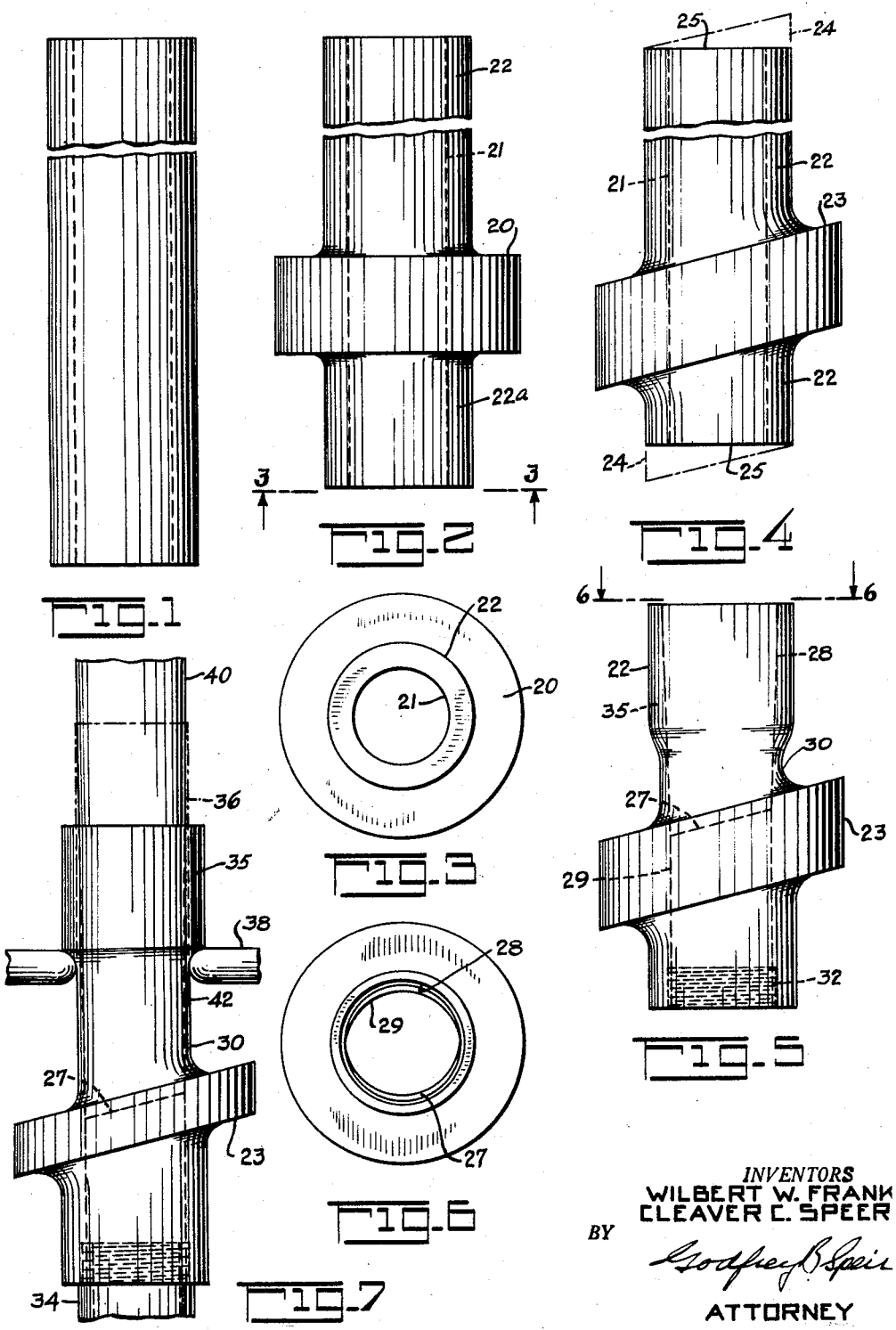

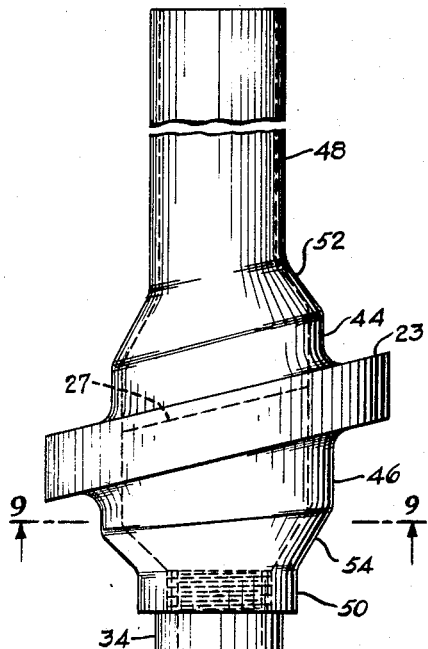
Fig. 8
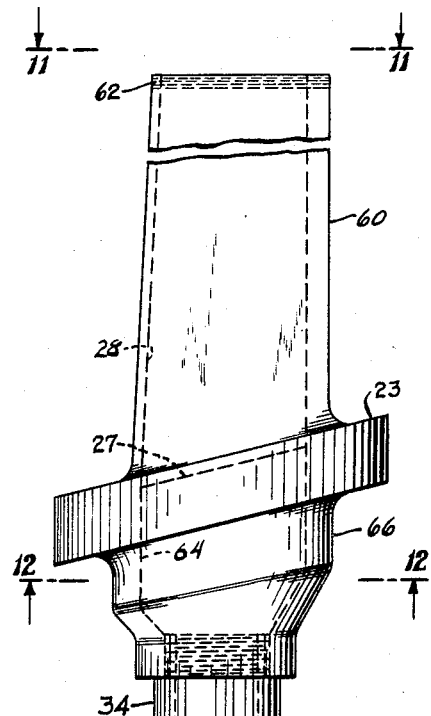
Fig. 10
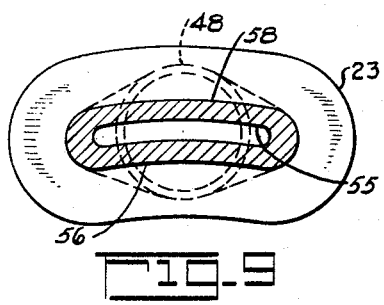
Fig. 9
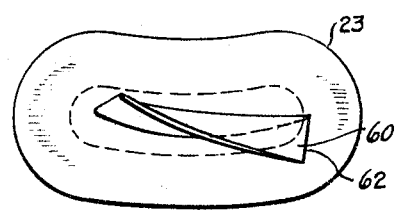
Fig. 11
Fig. 12
INVENTORS
WILBERT W. FRANK
CLEAVER C. SPEER
ATTORNEY July 12, 1960     C. C. SPEER ET AL     2,944,327
METHOD OF MAKING HOLLOW BLADES FOR TURBINE ENGINES
Filed Oct. 17, 1956     3 Sheets-Sheet 3
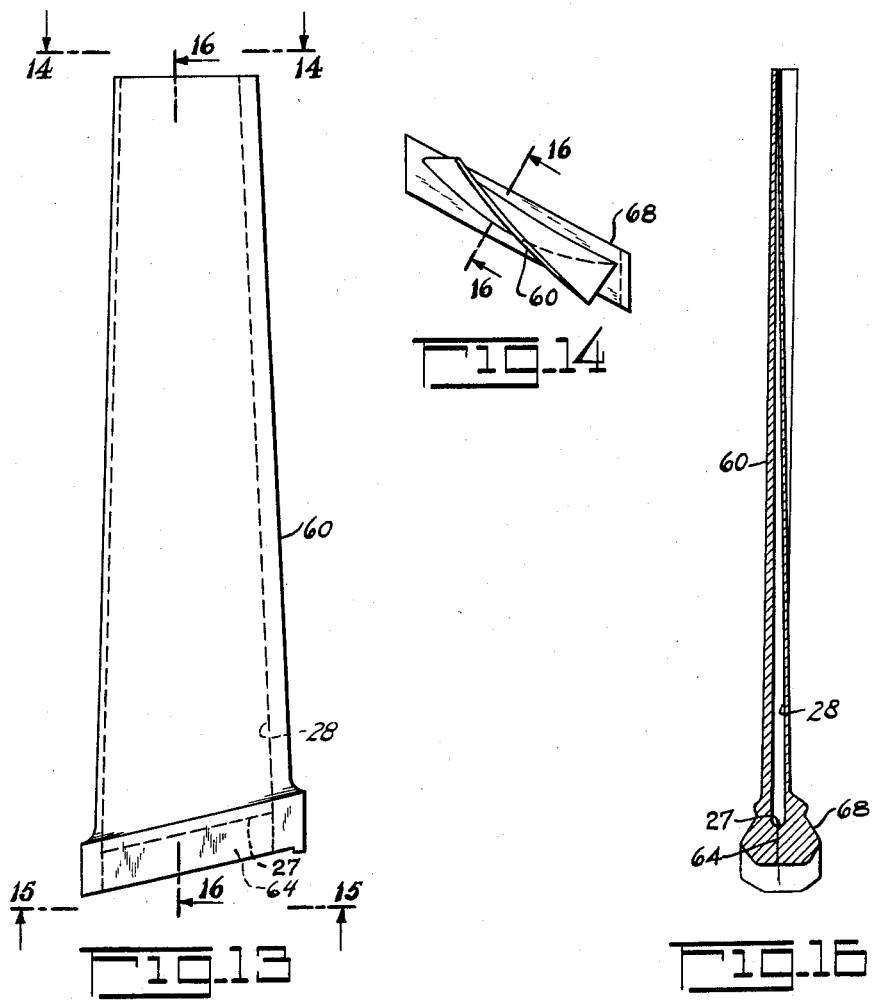
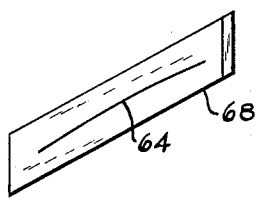
INVENTORS.
WILBERT W. FRANK
CLEAVER C. SPEER
BY
ATTORNEY

United States Patent Office 2,944,327
Patented July 12, 1960

METHOD OF MAKING HOLLOW BLADES FOR TURBINE ENGINES

Cleaver C. Speer, Passaic, and Wilbert W. Frank, Long Valley, N.J., assignors to Curtiss-Wright Corporation, Propeller Division, a corporation of Delaware Filed Oct. 17, 1956, Ser. No. 616,404

2 Claims. (Cl. 29—156.8)

This invention relates to metal working, and more particularly, to a new method for manufacturing hollow metal blades for use on turbine wheels, axial flow compressors or the like.

While the art of manufacturing turbine blades is well established, the advent of internal combustion gas turbines has created new problems and requirements for compressor and turbine blades which, in turn, require the development of new manufacturing techniques. The present invention provides a method of manufacture for hollow steel blades, or hollow blades of other metals which enables the production of blades of great strength and lightness. The advantages of strength and lightness are secured primarily through controlling the grain flow of the metal during the fabricating process, so that the use of the metal in the blade is extremely efficient. In other words, the manufacturing process produces a forged type of hollow metal blade whose grain flow is predominantly parallel to the directions of principal stress in the blade, whereby section thicknesses throughout the blade may be minimized.

By using efficiently formed hollow metal blades of low mass, problems of blade retention in the rim or hub of a rotor become considerably simpler than they have been heretofore. With this simplification, the complex blade retention forms of the prior art have been eliminated and a simpler bulbous type of blade butt fitted to a corresponding slot in the turbine rim becomes wholly adequate for satisfactory blade retention.

The invention includes method steps which are readily accomplished with more or less conventional production-type tooling and utilizes techniques for forming blade sections which produce the desired airfoil sections in the turbine blade without the requirement for complex machining operations.

The methods of the invention are explained in detail in the ensuing description, which should be read in conjunction with the annexed drawings in which similar reference characters designate similar parts and in which, Fig. 1 is an elevation of a tubular blank from which the blade is fabricated, Fig. 2 is a first step in the processing of the metal blank, Fig. 3 is a view on the line 3—3 of Fig. 2, Fig. 4 is a next step in the fabrication of the blade, Fig. 5 is the next step in the fabrication of the blade, Fig. 6 is a section on the line 6—6 of Fig. 5, Fig. 7 is a next step in the fabrication of the blade, Fig. 8 is a next step in the fabrication of the blade, Fig. 9 is a section on the line 9—9 of Fig. 8, Fig. 10 is a next step in the fabrication of the blade, Fig. 11 is a view on the line 11—11 of Fig. 10, Fig. 12 is a section on the line 12—12 of Fig. 10, Fig. 13 is an elevation of the sectioned blade, Fig. 14 is a view on the line 14—14 of Fig. 13, Fig. 15 is a view on the line 15—15 of Fig. 13, and Fig. 16 is a section on the line 16—16 of Fig. 13.

The following is a description of a specific procedure developed for the manufacture of a blade of specific design. Alternative procedural steps will be outlined as this description proceeds.

Fig. 1 represents a tubular metal blank used as a starting piece in the fabrication of the blade. Alternatively, the starting piece may be a piece of bar stock or the like which is formed into the tubular blank of Fig. 1. This blank is then heated and placed between forming or extruding dies so that an intermediate flange or upset portion 20 is formed thereon, the portion 21 of the piece remaining the same as the starting piece, and the thickness of the longer upper and lower portions of the blank, as at 22 and 22a remaining the same as the wall thickness of the original starting piece. The piece of Fig. 2 is then heated and re-formed in another set of dies so that the flange 20 is tilted, the tilted flange now being called 23.

Along with the tilting of the tube flange, the entire tube is tilted, forming sloped ends 24, which are cropped off so that the ends 25 will be in a plane normal to the edges of the piece. This tilting is to secure a tilted blade retention boss. If the blade design does not require a tilted retention, the step of Fig. 2 may be modified or omitted.

Fig. 5 represents the next series of operations which may be accomplished either in a single step or several steps, wherein a tapered circular punch is inserted in the upper end 22 of the workpiece with the piece heated, and forced down to form a ridge 27 so that the inner wall of the piece becomes tapered as at 28. A straight-sided punch, which may be part of the tapered punch, is rammed on through the blank to form a more or less elliptical cross section as at section 29 in Fig. 6 in the lower part of the blank extending from the extreme lower end of the blank to the line 27. The purpose of this elliptical cross section will be apparent as the description proceeds. In Fig. 5 also a portion of the outer wall of the tube is necked in just above flange 23 as at 30. The thickness of the wall at the portion 30 is made to substantially the same wall thickness as is desired in the finished article. A further step shown in Fig. 5 includes the tapping of the lower end of the workpiece as at 32. As indicated, these several operations, except probably for the threading operation, may all be accomplished in single punching and press operations or may, if desired, be done in several successive steps. The threading at 32 may be omitted or modified if a different sort of holding chuck is used, the holding chuck being shown in subsequent figures. It is also within the scope of the invention to combine tapering and forming the inner wall of the blank, along with forming the flange 23 in a single or fewer steps, so that the blank of Fig. 5 is attained without as many steps as have been outlined.

The blank of Fig. 5 is now screwed onto hollow chuck 34, as shown in Fig. 7, and is processed to develop the tapered thickened portion 35 of the blank into an elongated, thin-wall, tapered tube as indicated by dotted lines at 36.

The preferred mode of the development of the thin, tapered tube is to employ a high-speed, rotary impact forging machine, the hammers of which are indicated at 38. Such machines are known in the art and comprise in part a rotary head upon which the chuck 34 is secured, a mandrel 40 inserted into the tube blank and around which the tube portion is formed, and a plurality of hammers 38. These hammers have controlled strokes and reciprocate rapidly with respect to the surface of the workpiece while it rotates, forcing flow of the metal of the thickened blank portion 35 upwardly and along the mandrel 40. The strokes of the hammers 38 are closely controlled so that the thickness of the tube portions, as at 42, is held within desired limits. This hammer forging technique, which may be accomplished either hot or cold, works the material of the workpiece to produce fine grain structure arranged in a longitudinal direction. The workpiece, after the hammer forging operation, has the appearance defined by the structure shown in Fig. 7 below the hammers 38, and the structure above the hammers shown by dotted lines 36. Other modes of developing the thin, tapered tube wall are possible, such as roll forging or spinning. The process selected depends on economics, the malleability of the metal, the amount of metal to be moved or worked, and the thinness of the final tubular wall.

The workpiece of Fig. 7, after removal from the hammer forging equipment, is then partially flattened, as shown in Figs. 8 and 9, the partial flattening including the flange 23, a portion 44 of the tube above the flange, and a portion 46 of the tube below the flange. The upper part of the tube, as at 48, is left circular and the lower portion of the tube, as at 50, is also left circular, while tapered portions 52 blend the portions 44 and 48, and 54 which blend the portions 46 and 50. This flattening operation is accomplished, as shown in Fig. 9, to leave the central portion of the blank open, as at 55, preferably between curved dies to leave one face of the flattened portion concave, as at 56, and the opposite face convex, as at 58. It will be noted that the chuck 34 is still engaged with the workpiece. It is possible that the partial flattening just described may be omitted, and that the blank may go directly to the final forming operation described below.

Now referring to Figs. 10, 11 and 12, the workpiece, still on the chuck 34, is finally formed and flattened in a forming die, along the entire length of the blank except at portions adjacent the chuck. The previously circular part 48 of the blank, whose wall is quite thin, is pressed in the forming die to produce the airfoil-shaped blade portion, as at 60, which extends almost from the line 27 to the upper end of the piece. In the forming operation, the uppermost end of the blade is crimped, as at 62, and either during or after press closing, high pressure gas is permitted to enter the interior of the blank through the hollow chuck 34. The uppermost end may be held for a period of time in the crimped condition by crimping devices in the manner disclosed in the copending application of Wilbert W. Frank for "Compressor Blade and Method of Manufacture," Serial Number 537,451 filed September 29, 1955, and assigned to the same assignee as the present invention such that the high pressure gas introduced into the blank may not escape.

This forming operation is preferably accomplished while the workpiece is hot and the high internal gas pressure in the workpiece forces the walls of the blank into intimate contact with the forming dies so that the surfaces, particularly of the thin portions, of the blank conform precisely to the die configuration. For the fabrication of a blade for many designs of axial flow gas turbine, the hollow blade portion of the blank is twisted in the forming die, as shown in Fig. 11, to endow it with the desired pitch distribution characteristics. The sharp leading and trailing edges of the blade are obtained because of the shape of the forming die and its coining effect on the blank metal, and even though the tube blank is folded sharply to form these leading and trailing edges, the thinness and high temperature of the material is of such order as to enable this operation without the cracking of the material. Ring portion 23 and transition portion 52 of the blank are further flattened during the die forming operation. The inner faces 55 come into contact with one another as shown at 64 in Fig. 12, below the line 27, while the inner faces 28 are spaced apart to form a blade hollow.

The structure as shown in Figs. 10, 11 and 12 provides a finished blank form except for cropping off the crimped outer blade at 62 and for machining the finished retention. The article shown in Fig. 10 is now secured by the blade 60 in suitable apparatus close to the flange 23, the lower collet portion 66 is cropped off to provide the desired form of blade retention and the flange 23 is broached or otherwise cut to provide a blade retention boss or bulb 68. In Figs. 14 and 15, which show the blade and retention bulb, the ring 23 has been cut away to give the cross sectional configuration of rhombus. This is merely a form for a particular blade design. Other retention forms, as desired, may be produced.

As shown, the ring 23 is broached to provide sloped retention faces on the bulb 68 adapted to be held in a suitable retention slot in a turbine wall. In Fig. 16 it will be noted that the retention base portion interior walls are still in contact with one another along the line 64, also shown in Fig. 12. However, the line 27 marks the upper termination of the contacting walls 64 and the beginning of the hollow root end of the blade 60. Preferably, the line 27, as shown, is disposed about ⅓ of the retention depth below the blending of the retention portions 68 with the blade portion 60, to avoid sharp changes in section thickness and thereby avoiding high stress on the blade during operation. If desired, grooves may be cut in the faces 29 so that when they are closed together, an air or gas passage is left through the blade butt.

The process steps outlined in the foregoing description constitute a presently preferred method of fabricating our blades for turbines and compressors, but they are to be considered only as being exemplary. Various changes and modifications may be made in the design of the blade and in the process steps recited without departing from the spirit or scope of the invention insofar as such deviations and changes may be governed by the following claims.

We claim:

1. The method of making a hollow metal blade for a turbine engine which consists in forming a tubular blank having an intermediate thickened ring and tube portions extending from each end thereof, tapering the bore of one tube portion to a level within the thickened ring, forming the bulk of the ring bore to elliptical cross section, securing the blank to a hollow chuck attached to the other of the tube portions, working and flowing the metal of the said one tube portion over a tapered mandrel to form an elongated, thin, tapered wall blade-forming portion, flattening the blank in forming dies while maintaining gas pressure therewithin and in so doing bringing the elliptical bore portions into contact while leaving the blade-forming tube portion as a hollow portion of airfoil cross-section and trimming of the other tube portion and parts of the thickened ring to comprise a blade butt for retention in a turbine engine rotor.

2. The method of making a hollow metal blade for a turbine engine which consists in forming a tubular blank having an intermediate thickened ring and tube portions extending from each end thereof, reducing the thickness of one of said tube portions close to the thickened ring, tapering the bore of the latter tube portion to a level within the thickened ring, forming the bulk of the ring bore to elliptical cross section, securing the blank to a hollow chuck attached to the other of the tube portions, rotating the blank by means of the chuck and hammer forging the metal of the said one tube portion over a tapered mandrel to form an elongated, thin, tapered wall blade-forming portion, flattening the blank in forming dies while maintaining gas pressure therewithin and in so doing bringing the elliptical bore portion into contact while leaving the blade-forming tube portion as a hollow portion of airfoil cross-section, and trimming of the other tube portion and parts of the thickened ring to comprise a blade butt for retention in a turbine engine rotor.

References Cited in the file of this patent

UNITED STATES PATENTS

| | | |
|---|---|---|
| 1,869,478 | Heath | Aug. 2, 1932 |
| 1,905,944 | Lorenzen | Apr. 25, 1933 |
| 1,927,247 | Squires | Sept. 19, 1933 |
| 1,980,834 | Squires | Nov. 13, 1934 |
| 2,094,076 | Martin | Sept. 28, 1937 |
| 2,171,111 | Freygang | Aug. 29, 1939 |
| 2,328,348 | Lampton | Aug. 31, 1943 |
| 2,354,198 | Chubb | July 25, 1944 |
| 2,511,858 | Lampton | June 20, 1950 |
| 2,610,304 | Garner et al. | Sept. 9, 1952 |
| 2,743,509 | Friedman | May 1, 1956 |
| 2,830,357 | Tunstall et al. | Apr. 15, 1958 |